(No Model.)
H. S. SUTTER.
Automatic Vignetting Apparatus.
No. 236,731. Patented Jan. 18, 1881.
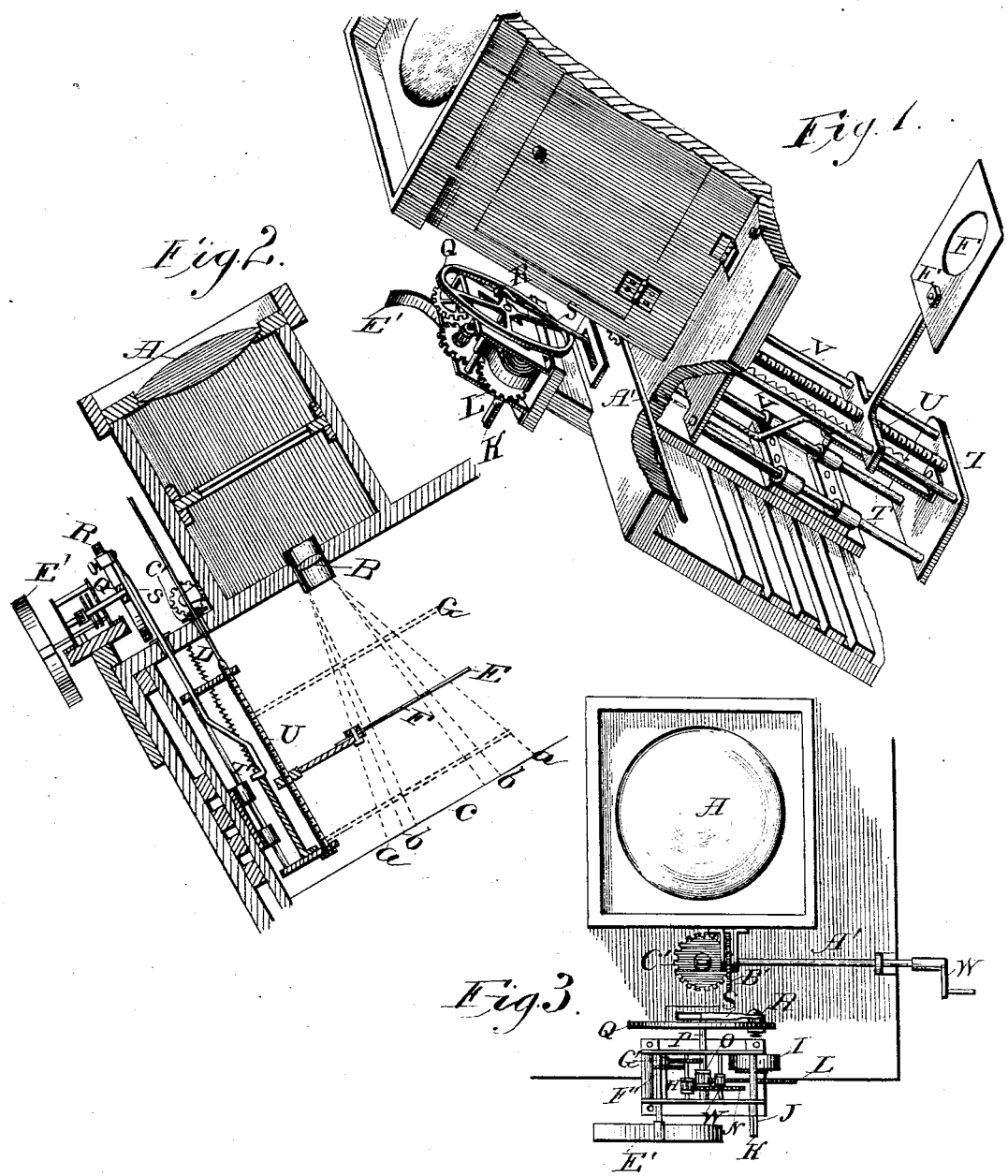
WITNESSES
C. G. Asmus
Charles F. Hunter
INVENTOR
Harry S. Sutter
By Jas. B. Erwin
ATTORNEY

UNITED STATES PATENT OFFICE.

HARRY S. SUTTER, OF MILWAUKEE, WISCONSIN.

AUTOMATIC VIGNETTING APPARATUS.

SPECIFICATION forming part of Letters Patent No. 236,731, dated January 18, 1881.

Application filed May 10, 1880. (No model.)

*To all whom it may concern:*

Be it known that I, HARRY S. SUTTER, a citizen of the United States, residing at Milwaukee, in the county of Milwaukee and State of Wisconsin, have invented certain new and useful Improvements in Vignetters for Solar Cameras; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to improvements in automatic vignetting apparatus.

The object of my improvement is to provide a device for automatically blending the light and shade upon the background of a photographic print, whereby the shading is gradually lightened from its center outward toward the margin.

My invention is further explained by reference to the accompanying drawings, in which—

Figure 1 represents a perspective view of my invention. Fig. 2 is a longitudinal section of the same. Fig. 3 is a top view of the same.

Like parts are represented by the same reference-letters throughout the several views.

The camera is constructed in the ordinary manner. Detailed views of the camera are shown, to illustrate the relative arrangement of my invention with the camera.

A is the object-glass. B is the lens. C represents the print or photograph, upon which the rays of light fall as they enter through the respective glasses A and B. The rays of light, when uninterrupted, are distributed evenly over the entire surface of the print C, and the chemical action of the light upon the print is therefore uniform over its entire surface, the effect of which is objectionable, it being desirable to gradually lighten the background toward the margin, which end is accomplished by the blender E. The blender E is constructed of card-board or any thin light material which will obstruct the rays of light. An opening, F, is formed through the center of the blender, through which the rays of light pass unobstructed to the print.

It is obvious that the extent of surface covered by the rays of light is increased or diminished by changing the relative position of the blender to the lens and print. When the blender is near the lens, in the position shown at G, the refracted rays of light fall upon lines *a a*, thus covering, if desired, the entire surface of the print. When the blender is moved farther from the lens, in the position shown at X, the rays of light are cut off from the margin to lines *b b*. Thus, by cautiously moving the blender backward and forward between the positions indicated, the rays of light surrounding the print are alternately admitted and obstructed in their passage to the print, and the chemical effect of the light thus admitted is to blend the shade around the print, causing it to be gradually lightened from the center outward, as mentioned.

My invention relates more particularly to the device for automatically moving the blender in the manner described. Motion is communicated to the blender from clock-work gears, driven by a spring or weight, a spring, however, being preferred.

I represents the driving-spring, which is secured to the winding-shaft J. The shaft J is provided with a common clock-work pawl-and-ratchet device for checking the backward motion when wound up. The spring is wound by applying a key to the end of shaft J.

Motion is communicated from the spring through the several gears L M N O to shaft P, which shaft is provided with a balance-wheel, Q. The wheel Q is provided with a pitman, R, which is connected with crank S. The crank S is connected with the reciprocating vignetter-frame T, and communicates a reciprocating motion to it with each revolution of the wheel Q. The blender E is secured to the frame T, and is thus caused to move alternately backward and forward between the lens and print, whereby the surface of the print is alternately lighted up and shaded, as indicated.

The blender E is adjusted nearer to or farther from the lens by means of the screw U, by which its relative position to the frame T is changed. For a small print it is adjusted farther from the lens. For a large print it is adjusted nearer to it. The T-shaped device which supports the blender moves loosely upon the rods V V. Thus, as the screw is turned toward the right it draws the blender toward the lens, and when turned in the opposite direction it is moved toward the print. The screw is operated by turning the crank W, which acts, through the rod A′, pinions B′ and C′. The pinion C′ has a square opening through its center for the reception of the upper end of the screw U, which is loosely fitted therein, and as the pinion C′ revolves forward the screw is caused to revolve with it, while at the same time the screw-rod is free to be moved upward and downward through the pinion C′, in connection with the reciprocating frame T. Thus the blender may be adjusted in its relative position to the frame without stopping the clock-work or interfering with the reciprocating motion of the frame which supports it.

D is a spiral spring, which is connected with the camera-box or any fixed point at its upper end and the reciprocating frame at its lower end, the office of which is to counteract the gravity of the frame as the frame descends, and with the upward movement of the frame the contracting force of the spring assists in raising the frame, thus aiding to produce a uniform movement.

E′ is a fan, the office of which is to check and regulate the motion of the device and assist in producing a slow uniform motion. The fan E′ is connected with the motor-spring by pinion F′, G, and H, substantially as shown.

Having thus described my invention, what I claim as new, and desire to secure by Letters Patent, is—

1. The automatic vignetting apparatus herein described, consisting, essentially, in the blender E, reciprocating frame T, crank-rod S, wheel Q, connecting-gears L, M, N, O, H, G, and F, regulating fan E′, and the motor-spring I, all combined and arranged to operate substantially as and for the purpose set forth.

2. In an automatic vignetting apparatus, the blender E, screw U, adapted to adjust the blender relatively to the frame T, pinion C′, adapted to revolve the screw U and permit the screw-rod freely to pass through it, and the spiral D′, adapted to regulate the motion of the blender, substantially as and for the purpose specified.

3. In an automatic vignetting apparatus, the combination of the blender E, screw-rod U, pinions C′ B′, shaft A′, and crank W, substantially as described, and for the purpose set forth.

In testimony whereof I affix my signature in presence of two witnesses.

HARRY S. SUTTER.

Witnesses:
JAS. B. ERWIN,
W. J. SINNOTT.